Aug. 28, 1928.
R. D. J. B. WEBBER
1,682,647
BRAKE BEAM SUPPORT
Filed May 19, 1927
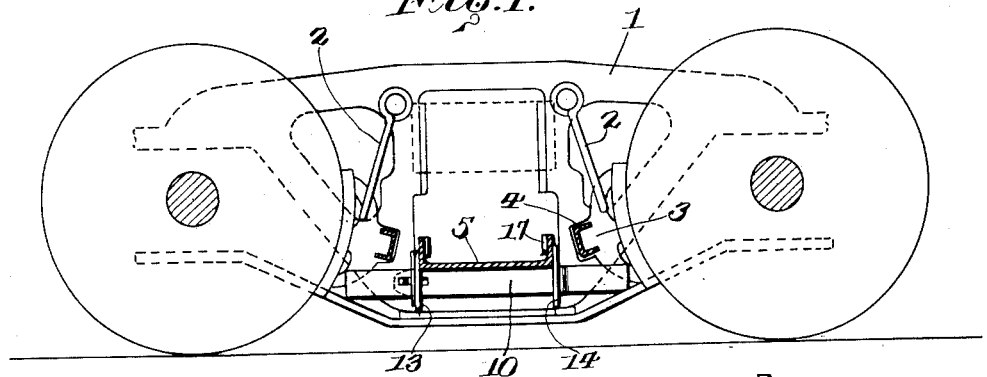
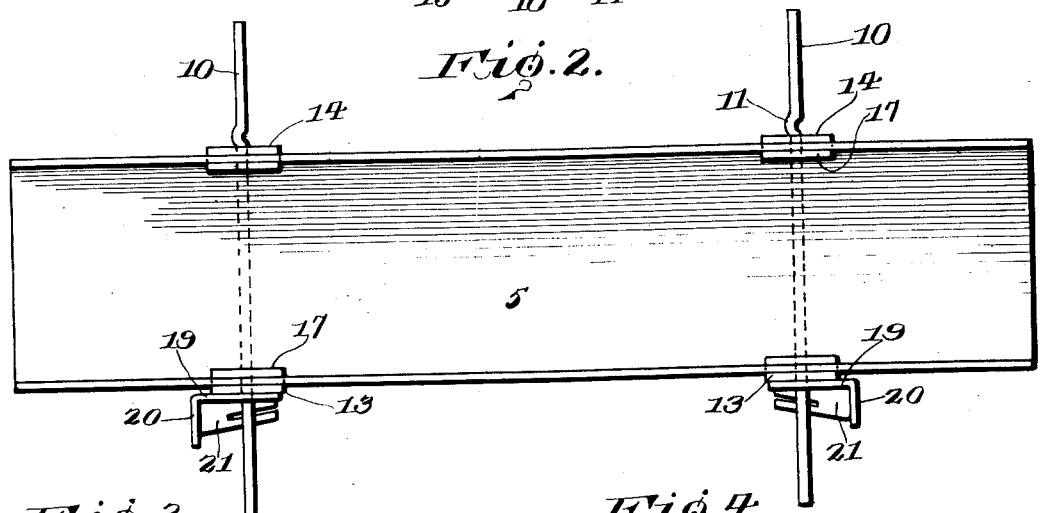
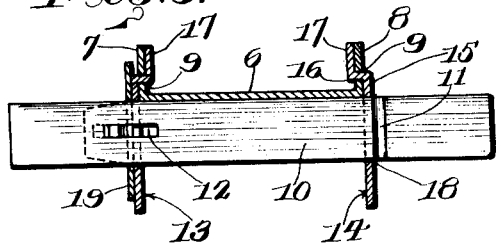
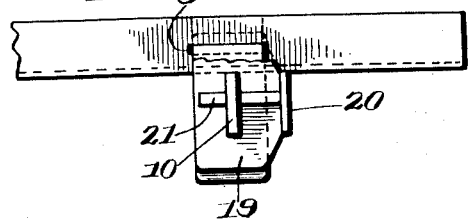
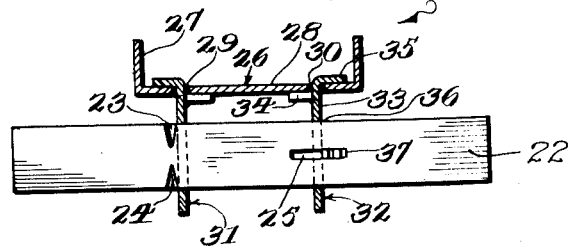
INVENTOR.
Robert D. J. Burns Webber,
BY
Geo. F. Kimmel
ATTORNEY.

Patented Aug. 28, 1928.

1,682,647

UNITED STATES PATENT OFFICE.

ROBERT D. J. BURNS WEBBER, OF ALLENTOWN, PENNSYLVANIA.

BRAKE-BEAM SUPPORT.

Application filed May 19, 1927. Serial No. 192,641.

This invention relates to a brake beam support, and has for its object to provide, in a manner as hereinafter set forth, a structure of such class not only embodying the objects and advantages as set forth in the safety brake hanger construction disclosed in Letters Patent 1,607,416 granted to me November 16, 1926, but has for its further objects to provide a structure of the class to which invention relates in a manner whereby it can be employed with varying sizes of spring planks of trucks, more especially for spring planks which are wide.

A further object of the invention is to provide, in a manner as hereinafter set forth, a brake beam support including new, novel and original means for detachably connecting the elements of the structure together.

Further objects of the invention are to provide, in a manner as hereinafter set forth, a brake beam support which is simple in its construction and arrangement, strong, durable, thoroughly efficient in its use, conveniently installed, and comparatively inexpensive to manufacture.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a longitudinal sectional view of a car truck showing the adaptation therewith of a brake beam construction or structure in accordance with this invention.

Figure 2 is a top plan view of the structure.

Figure 3 is a transverse sectional view thereof.

Figure 4 is a fragmentary view in end elevation.

Figure 5 is a cross sectional view of a modified form.

Referring to the drawings in detail 1 indicates a side frame of a car truck and from which by means of the hangers 2 the brake shoes 3 and brake beams 4 are suspended. As is well known the brake beams 4 extend transversely of the truck between the side frames thereof. As is well known the frames of the truck are connected together, between the front and rear wheels thereof, by a channel beam 5.

The channel beam 5 consists of a bottom 6 and a pair of upstanding side flanges 7, 8. Each of said flanges adjacent each end thereof is formed with a lengthwise extending slot 9. The slots of the flanges are arranged in alignment.

With reference to Figures 1 to 4, a pair of longitudinally extending supporting beams 10 are provided for the channel beam 5. The supporting beams 10 are arranged in spaced relation, and disposed transversely with respect to the channel beam 5 and arranged directly below the slots 9. Each beam 10 is formed with a transversely extending lateral offset portion 11 adjacent one end thereof to form an abutment and further provided adjacent its other end with a longitudinally extending slot 12 which is disposed at the longitudinal median of the beam.

Each end of the channel beam 5 is coupled to a support 10 by a pair of oppositely disposed combined supporting and coupling members 13, 14. Each coupling member comprises a vertically disposed rectangular body portion 15 of a height greater than the height of the beams 10 and which merges into an inwardly extending right angularly disposed intermediate portion 16, the latter merging into a vertically disposed upper end portion 17. The lower end portion 15 is provided with a vertically disposed slot 18. When the coupling members are mounted in position a support 10 extends through the slot 18 of each pair of coupling members, the intermediate portions 16 of these latter extend through aligning slots 9 and the upper end portions 17 of the said members abut against the inner faces of the side flanges of the channel beam 5. When the coupling member 14 is mounted in coupling position it abuts against the offset portion 11, that is to say against the inner side thereof whereby said coupling piece cannot shift in a direction away from that side flange of the channel beam 5 with which it associates. When the coupling member 13 is mounted in coupling position it extends across the slot 12 formed in the supporting beam 10. Positioned against the outer face of the lower end portion 15 of the coupling member 13 is a slotted retaining plate 19 which also extends across the slot 12. The retaining plate 19 at one side thereof is formed with a bendable wing 20 for a purpose to be presently referred to.

The coupling member 14 is maintained in position against the offset 11, as well as against the flange 8, and the coupling member 13 is maintained in position against the flange 7, by a wedge 21 which is extended through the slot 12 and bears against the retaining plate 19. After the wedge 21 has been secured in position, the ear 20 is bent to abut against the larger end of the wedge 21 to prevent the same from slipping out of the slot 12.

In the form shown in Figure 5 the supporting beam 22, which corresponds to either of the beams 10, is formed with a pair of aligning offsets 23, 24 projecting from one face thereof. The beam 22 is also provided with a lengthwise extending slot 25 disposed at the longitudinal center thereof. The channel beam 26 which corresponds to the channel beam 5, does not have its side flanges 27 provided with slots, but has its bottom 28 adjacent each end formed with a pair of opposed parallel lengthwise extending slots 29, 30 arranged at an appropriate distance from the flanges 27.

The channel beam 26 is coupled with and supported in spaced relation with respect to the beam 26, by a pair of combined coupling and supporting members 31, 32. The member 31, as well as the member 32, comprises a rectangular body portion 33 provided at its top with oppositely extending tongues 34, 35 arranged one above the other. The tongues formed at the upper end of the member 31 are oppositely disposed with respect to the tongues formed at the upper end of the member 32. The body portion 33 is provided with a vertically disposed slot 36 for the passage of the beam 22. When the member 31 is mounted in its combined coupling and supporting position, with respect to the beam 26, the body portion of the member 31 abuts against the offsets 23, 24, and the tongue 34 of the member 31 is positioned against the lower face of the bottom 28. The body portion of the member 31 extends up through the slot 29 and the tongue 35 of the member 31 is seated on the upper face of the bottom 28. The member 32 when in coupling supporting position extends across the opening 25 and its tongue 34 abuts against the lower face of the bottom 28 and its tongue 35 is positioned on the upper face of the bottom 28. The body portion 33 of the member 32 extends through the slot 30. Each combined coupling and supporting member is bifurcated at its upper end and the material of the bifurcated portion is bent to form an inwardly extending tongue 34 and a pair of outwardly extending spaced tongues 35. The coupling member 32 is maintained in position by a wedge 37 which extends through the slot 25 and provides for the offsets 23, 24, to abut against the member 31. The wedge 37 furthermore provides for the tongues to engage the upper and lower faces of the bottom 28 of the channel beam 26.

The construction and arrangement of the brake beam support provides for it to be expeditiously installed and removed when required, and further provides a rigid and a strong support for the brake beams, therefore it is thought the many advantages of a brake beam support, in accordance with this invention, can be readily understood, and although the preferred embodiment of the invention is as illustrated and described, yet it is to be understood that changes in the details of construction can be had which fall within the scope of the invention as claimed.

What I claim is:

1. In a brake beam support of that type including a connecting element between the side frames of a truck, the combination of supporting beams disposed transversely of and below said element, and each formed with a transversely extending lateral offset and a slot spaced from the lateral offset, said offset forming the beam with an integral abutment, combined coupling and supporting members mounted on said beams and detachably engaging with said element for connecting it with said beams, and means extending through said slots for maintaining certain of said coupling members in abutting engagement with said offsets and all of said members from shifting on said beams and in coupling position with respect to said element.

2. In a brake beam support of that type including a connecting element between the side frames of a truck, the combination of supporting beams disposed transversely of and below said element, and each formed with an offset and a slot, combined coupling and supporting members mounted on said beams and detachably engaging with said element for connecting it with said beams, and wedges extending through said slots for maintaining certain of said coupling members in abutting engagement with said offsets and all of said members from shifting on said beams and in coupling position with respect to said element.

3. In a brake beam support of that type including a connecting element between the side frames of a truck, the combination of supporting beams disposed transversely of and below said element, and each formed with an offset and a slot, combined coupling and supporting members mounted on said beams and detachably engaging with said element for connecting it with said beams, wedges extending through said slots for maintaining certain of said coupling members in abutting engagement with said offsets and all of said members from shifting on said beams and in coupling position with respect to said element, and means for retaining said wedges in said slots.

4. In a brake beam support of that type including a connecting element between the side frames of a truck, the combination of supporting beams disposed transversely of and below said element, and each formed with an offset and a slot, combined coupling and supporting members mounted on said beams and detachably engaging with said element for connecting it with said beams, wedges extending through said slots for maintaining certain of said coupling members in abutting engagement with said offsets and all of said members from shifting on said beams and in coupling position with respect to said element, and means mounted on the beams for retaining said wedges in said slots.

5. A brake beam support comprising the combination with a channel beam for connecting the side frames of a truck together, said beam having spaced slots in its side flanges, of supporting beams extending transversely with respect to said channel beam, and each formed with an abutment and a slot, combined coupling and supporting members extending through the slots of one of the flanges of the channel beam and mounted on said supporting beams inwardly of said abutments, combined coupling and supporting members extending through the slots of the other flange of the channel beam and mounted on said supporting beams to extend across the slots of the latter, and wedges mounted in said slots of the supporting beams for securing said members in position.

6. A brake beam support comprising the combination with a channel beam for connecting the side frames of a truck together, said beam having spaced slots in its side flanges, of supporting beams extending transversely with respect to said channel beam, and each formed with an abutment and a slot, combined coupling and supporting members extending through the slots of one of the flanges of the channel beam and mounted on said supporting beams inwardly of said abutments, combined coupling and supporting members extending through the slots of the other flange of the channel beam and mounted on said supporting beams to extend across the slots of the latter, wedges mounted in said slots of the supporting beams for securing said members in position, and means for retaining the wedges in securing position.

In testimony whereof, I affix my signature hereto.

ROBERT D. J. BURNS WEBBER.